US007085625B2

(12) United States Patent
Timothy et al.

(10) Patent No.: US 7,085,625 B2

(45) Date of Patent: Aug. 1, 2006

(54) CONTROL SYSTEM FOR BALING MACHINE

(75) Inventors: Stamps Timothy, Carl Junction, MO (US); Bart Daniel, Kennesaw, GA (US); Steven Phillips, Columbus, GA (US); James Dutton, Phenix City, AL (US)

(73) Assignee: L&P Property Management Company, South Gate, CA (US)

( * ) Notice: Subject to any disclaimer, the term of this patent is extended or adjusted under 35 U.S.C. 154(b) by 220 days.

(21) Appl. No.: 10/642,566

(22) Filed: Aug. 15, 2003

(65) Prior Publication Data

US 2004/0054441 A1 Mar. 18, 2004

Related U.S. Application Data

(63) Continuation of application No. 09/919,111, filed on Jul. 31, 2001, now Pat. No. 6,633,798.

(51) Int. Cl.

| | |
|---|---|
| ***G01M 1/38*** | (2006.01) |
| ***G05B 13/00*** | (2006.01) |
| ***G06F 19/00*** | (2006.01) |
| ***B65B 13/02*** | (2006.01) |

(52) U.S. Cl. ............................ 700/275; 700/7; 700/56; 700/80; 700/95; 701/50; 100/3

(58) Field of Classification Search .................... 700/1, 700/7, 9, 11–14, 17–19, 23, 28, 33, 56, 61, 700/63, 80, 83, 89, 90, 95, 245, 257, 261, 700/275; 701/50; 100/2-5

See application file for complete search history.

(56) References Cited

U.S. PATENT DOCUMENTS

| | | | | |
|---|---|---|---|---|
| 2,632,381 A | 3/1953 | Buckland | ........................ | 100/7 |
| 2,780,986 A | 2/1957 | Ritenour | ...................... | 100/25 |
| 3,070,001 A | 12/1962 | Feldkamp | .................... | 100/25 |
| 3,470,813 A | 10/1969 | Nomm et al. | .................. | 100/4 |

(Continued)

OTHER PUBLICATIONS

IEEE 100 Authoritative Dictionary of IEEE Standards Terms, $7^{TH}$ Edition, Standards Information Network IEEE Press, p. 273.

(Continued)

*Primary Examiner*—Leo Picard
*Assistant Examiner*—Sean Shechtman
(74) *Attorney, Agent, or Firm*—Husch & Eppenberger, LLC; Grant D. Kang

(57) ABSTRACT

A control system for a bulk material baler embodied in a machine readable data structure and including an instruction to a moveable guide track to move from a removed position to a closed position to create a guide track loop around a volume of bulk material to be baled while that bulk material is under compression and also including in instruction to a bale strap feed drive to feed a pre-determined length of strapping around the guide track loop, and including an instruction to a cutter to cut the end of the bale strap and including an instruction to a strap fastener to fasten together the ends of the bale strap and including an instruction to remove the moveable guide track section from around the bale and an instruction to release compression and an instruction to eject a bound bale.

25 Claims, 12 Drawing Sheets

U.S. PATENT DOCUMENTS

| | | | | |
|---|---|---|---|---|
| 3,568,591 A | 3/1971 | Dunlap | 100/4 |
| 3,621,888 A | 11/1971 | Ericsson | 140/93.2 |
| 3,720,158 A | 3/1973 | Sauer et al. | 100/4 |
| 3,834,297 A | 9/1974 | Huson | 100/3 |
| 3,863,558 A | 2/1975 | Trumbo | 100/33 |
| 3,910,089 A | 10/1975 | Meier et al. | 72/146 |
| 3,921,799 A | 11/1975 | Meir | 206/83.5 |
| 3,935,616 A | 2/1976 | Simmons | 24/20 EE |
| 4,031,594 A | 6/1977 | Cepuritis | 24/20 EE |
| 4,048,697 A | 9/1977 | Duenser | 24/20 EE |
| 4,062,086 A | 12/1977 | Wojcik | 24/20 EE |
| 4,079,667 A | 3/1978 | Lems et al. | 100/2 |
| 4,080,689 A | 3/1978 | Meier | 24/20 EE |
| 4,090,440 A | 5/1978 | Jensen | 100/4 |
| 4,156,385 A | 5/1979 | Lems et al. | 100/3 |
| 4,158,994 A | 6/1979 | Jensen | 100/3 |
| 4,226,007 A | 10/1980 | Duenser | 24/20 EE |
| 4,228,565 A | 10/1980 | Lems et al. | 24/20 EE |
| 4,378,262 A | 3/1983 | Annis, Jr. | 156/73.5 |
| 4,391,186 A | 7/1983 | Davis | 100/7 |
| 4,403,542 A | 9/1983 | Lewis | 100/2 |
| 4,450,763 A | 5/1984 | Saylor | 100/31 |
| 4,466,535 A | 8/1984 | Huson | 206/83.5 |
| 4,484,518 A | 11/1984 | Jaenson | 100/4 |
| 4,498,379 A | 2/1985 | Saylor | 100/2 |
| 4,501,356 A | 2/1985 | Urban et al. | 206/83.5 |
| 4,520,720 A | 6/1985 | Urban et al. | 100/26 |
| 4,534,817 A | 8/1985 | O'Sullivan | 156/352 |
| 4,584,935 A | 4/1986 | Luggen | 100/26 |
| 4,611,534 A | 9/1986 | Kudlicka et al. | 100/26 |
| 4,625,635 A | 12/1986 | Lewis | 100/26 |
| 4,649,812 A | 3/1987 | Mouret | 100/5 |
| 4,665,815 A | 5/1987 | Fleissner | 100/2 |
| 4,718,336 A | 1/1988 | Munro | 100/3 |
| 4,787,425 A | 11/1988 | Saylor | 140/73 |
| 4,951,562 A | 8/1990 | Ribaldo | 100/8 |
| 5,009,154 A * | 4/1991 | Boes | 100/5 |
| 5,039,250 A | 8/1991 | Janz | 405/15 |
| 5,070,779 A | 12/1991 | Molitorisz | 100/31 |
| 5,117,536 A | 6/1992 | Beach et al. | 24/20 R |
| 5,133,532 A | 7/1992 | Figiel et al. | 254/216 |
| 5,239,919 A | 8/1993 | Maki et al. | 100/35 |
| 5,379,687 A | 1/1995 | Moseley | 100/3 |
| 5,417,320 A | 5/1995 | Velan et al. | 206/83.5 |
| 5,477,724 A | 12/1995 | Velan et al. | 72/385 |
| 5,483,837 A | 1/1996 | Velan et al. | 73/805 |
| 5,546,855 A | 8/1996 | Van Doorn et al. | 100/11 |
| 5,631,826 A * | 5/1997 | Chow | 700/84 |
| 5,644,978 A | 7/1997 | Jaenson et al. | 100/8 |
| 5,673,614 A | 10/1997 | Jaenson et al. | 100/8 |
| 5,689,934 A | 11/1997 | Scherer et al. | 53/399 |
| 5,746,120 A | 5/1998 | Jonsson | 100/4 |
| 5,826,499 A | 10/1998 | Bullington | 100/3 |
| 5,870,950 A | 2/1999 | Wiedel | 100/33 R |
| 6,035,773 A | 3/2000 | Rempe | 100/2 |
| 6,363,843 B1 | 4/2002 | Daniel et al. | 100/3 |
| 6,397,738 B1 | 6/2002 | Brown, Jr. | 100/3 |

OTHER PUBLICATIONS

The American Heritage Dictionary of the English Language, 4TH Edition 2000, Houghton Mifflin Company.
Brochure: "Packaging Solutions for Large Products", Automat, Barcelona, Spain, Undated, 16 Pages.

* cited by examiner

CONTROL SYSTEM FOR BALING MACHINE

CROSS-REFERENCE TO RELATED APPLICATIONS

This application is a continuation of U.S. application Ser. No. 09/919,111 filed Jul. 31, 2001, now U.S. Pat. No. 6,633,798.

STATEMENT REGARDING FEDERALLY SPONSORED RESEARCH OR DEVELOPMENT

Not Applicable.

BACKGROUND OF THE INVENTION

1. Field of the Invention

This invention relates generally to a wire bale binding machine that uses a control system incorporating memory, sensors and programmable logic controllers.

2. Related Art

Wire baling of bulk materials benefits from increased speed and reduced materials cost through automation. Bulk materials include fibrous bulk materials such as cotton and nylon. Fibrous materials are commonly formed into bales by simultaneous compression and binding. There is a continuing need in the automated baling art to improve the efficiency, reliability and accuracy of the bale binding process.

Baling wire performance requirements vary depending upon the bulk material being baled. Such requirements range from industry standard specifications to general operational parameters, such as minimum speeds required for profitability. The Cotton Council issues standards specifying particular lengths of wire around various sizes of bales and the tension that the wires must withstand. These standards vary for different bale configurations such as a "standard density" bale or "universal density" bale. The most common bale configuration is "standard density," which is 20×54 inches in size, for which Cotton Council Industry Standards require six baling wires which are 9¼ inches apart from one another.

Current automated baling machines use an articulated track to guide wire around bales of bulk material, such as cotton, while that bale is under compression. Part of the wire guide track in current automated balers must be removable to a second position after the ends of the baling wire have been tied together, in order to allow ejection of the bale and insertion into the baler of the next unit of material for baling. Material to be baled is typically introduced into the automatic baler under vertical compression. Typical pressures for an industry standard 500 pound, 20×54 inch bale are in excess of 300 tons. Horizontal plates called follower blocks apply compression through platens which contact the surface of the cotton or other material being compressed. The Platens incorporate slots which run lateral to the longitudinal axis of the bale. There are six slots in the platens to allow six baling wires to be wrapped around the bale while it is still under compression. The lateral slots have lateral channels behind them for insertion of wire guide tracks in both the upper and lower platens in automatic balers.

Current automated baling machines operate with a certain degree of inefficiency. In order to loop baling wire around bulk material to be baled, release it from a guide track and knot the ends, tension must be generated on the wire. Likewise, in order to properly knot the ends of the wire, tension must be maintained in the twisting procedure that generates the knot. These tensions must be maintained within prescribed ranges to optimize efficiency and to produce a final bale compliant with industry standards. Certain knotting speeds must be avoided because too much speed in the twisting procedure produces metal fatigue. Too great a degree of tension overall can generate weaknesses or wear-points in the baling wire, or can generate wear in the wire guide tracks or other parts of the automated baling machine. Automated baling machines would benefit from more precise control of such variables. Currently, large margins of error for tension, torques and speeds must be built into the apparatus and method of using the apparatus in order to assure reliability of both the apparatus and the bulk material bales they produce. These wide margins of error manifest themselves in a variety of process difficulties, notably increased cycle time. Moreover, wide margins of error necessitate use of heavier gauge wire, which is more expensive.

There is a need in the art to increase the precision of controls in order to maximize speed while maintaining adequate compliance with industry standards, to maximize efficiency and reliability and in order to minimize wear and damage.

SUMMARY OF THE INVENTION

It is in the view of the above problems that the present invention was developed. The invention is a control system for an automatic bulk material baling apparatus. The control system incorporates Programmable Logic Controllers ("PLC's") and data structures within memories capable of controlling a plurality of variables of process control. Each bale wire loop on a bulk material bale is produced by an individual "head." Each head incorporates drive wheels and a fastener. The drive wheels and fastener of the present invention are powered with electro-servo motors. Each motor is considered an "axis" of control. In addition, each head uses a tensioning gripper, moveable tensioning pins and a cutter, all of which are controllable by the control system of the present invention. The dynamic memory of the control system is configured to precisely control all relevant parameters.

Control is effected through the PLC of the control system. Each axis of control, separately for each head, has a separate memory space in the control system of the present invention, so that each head may be controlled individually. The PLC and memory of the present control system track the precise position of the drive wheel shafts and Fastener head tying cylinder shafts at all times to within a thousandth of an inch. Thus, the control system can precisely measure and control position and speed. The amperage of current being used by the electro-servo motors controlling the drive wheels and tying cylinders is also precisely measured at all times. This current quantity corresponds to a quantity of torque which is pre-configured at optimal levels in the control systems memory. Precise torque control benefits wire tensioning and knot tying.

In operation, the position tracking of the present control system allows precise control of the speed of the progress of baling wire around the bulk material. In prior art balers the baling wire triggered a limit switch upon completion of its loop around the bulk material, which closed a rely, signaling a tensioning gripper to hold the end of the wire. In the present invention, precise electro servo tracking of wire payout replaces external limit switches. The drive wheels are then reversed in order to generate a pre-configured degree of tension on the baling wire.

This reverse tension is precisely controlled by the control system of the present invention through use of a pre-configured memory of the desired torque on the drive wheels. The torque is precisely monitored with constant servo motor feedback of the amperage drawn. Similarly, current feedback is monitored in the fastener electro-servo motor, which drives a rotational tying cylinder. Both torque control and position control are used by the control system of the present invention to efficiently control the tying of a knot in the baling wire in a fashion that maximizes speed while remaining within industry standard strength and tension limits. After looping the bale wire; releasing the wire from the wire guide track, tying the knot cutting the wire, the control system of the present invention is pre-configured to release the bale wire loops.

The baling apparatus control system of the present invention is also pre-configured to control the sequential progression of the bale compression apparatus, moveable guide track sections and ejection apparatus. This is done through permissive process control memory which sequentially signals activation of the next step in the process upon receipt of a signal that the previous step is complete.

In operation, a compression apparatus moves a volume of bulk material to be baled into a baling station whereupon a limit switch signals the control system of the present invention that the volume of bulk material is ready to be baled. The control system signals the moveable guide track sections to be rotated into place in order to complete the wire guide track loop around the material to be baled. The control system of the present invention then controls the baling operation itself, as described above. Upon receipt of a signal from the fastener that baling is complete, the control system of the present invention moves the moveable guide track sections clear of the baling station so that the completed bale may be ejected. Thereafter the control system of the present invention signals the compression apparatus to release compression and then signals the ejection apparatus to remove the completed bale from the baling station. This cycle repeats.

Further features and advantages of the present invention, as well as the structure and operation of various embodiments of the present invention, are described in detail below with reference to the accompanying drawings.

DETAILED DESCRIPTION OF THE PREFERRED EMBODIMENTS

Figure 1:
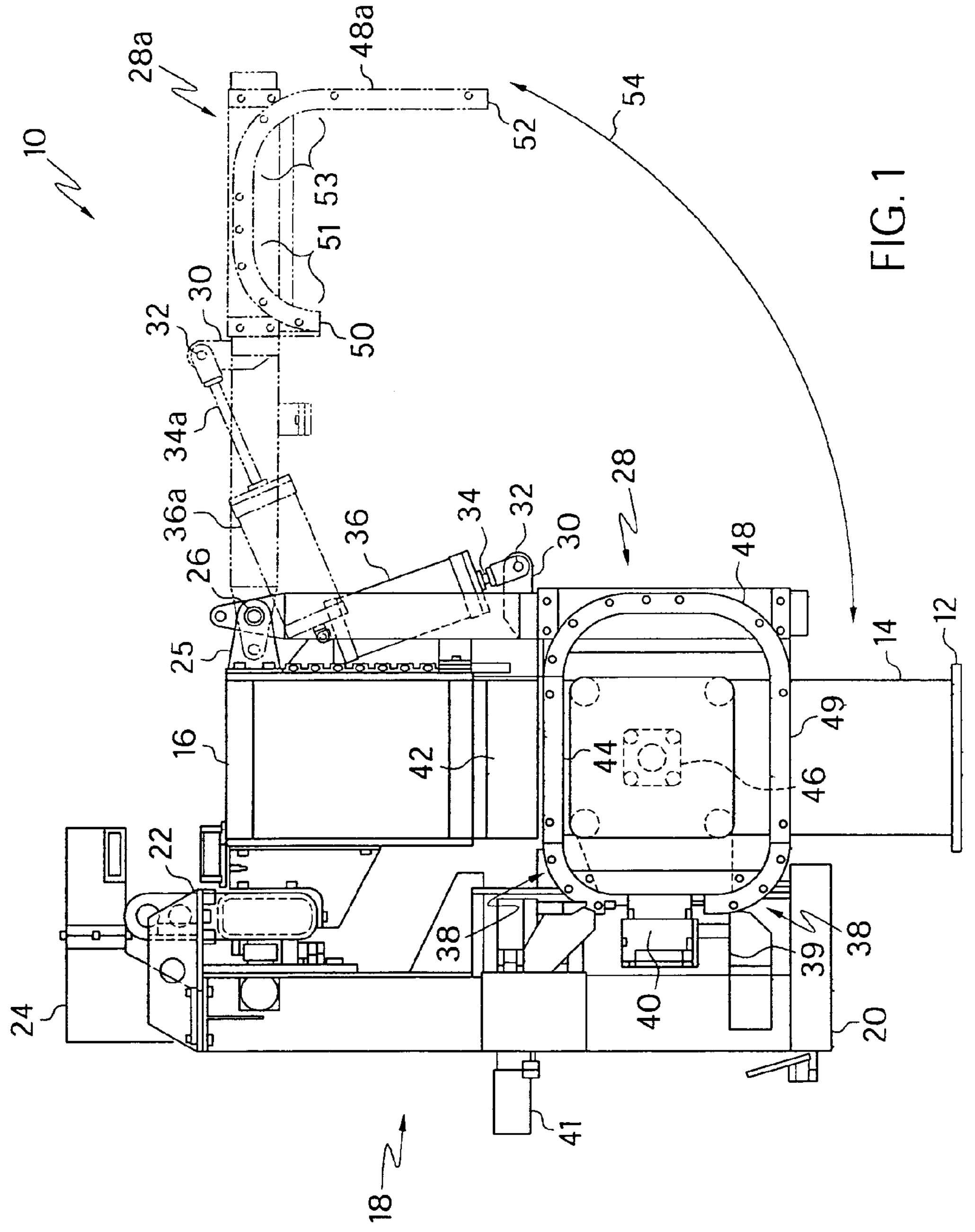
FIG. 1 is a side view of an automatic baling machine.

Referring to the accompanying drawings in which like reference numbers indicate like elements, FIG. 1 is a side view of an automatic baling machine. The bale binding apparatus, 10, is depicted to show two positions; the solid lines illustrate a first position wherein a moveable wire guide track section, 48, and moveable wire guide track section support strut assembly, 28, are in a first position to complete a wire guide track trajectory when bale binding is in progress; and the broken lines illustrate a second position wherein the moveable wire guide track section support strut assembly and moveable wire guide track section are removed to a second position, 28*a*. The second position allows ejection of the finished, bound bale. A third "ready" position (not shown) is between the two illustrated positions. In the "ready" position, the wire guide tracks are clear of the vertical path of the bale compressor apparatus, but not high enough to be clear of a horizontal ejection path.

A floor plate, 12, supports vertical support stands, 14, on either side of the bale binding station, 46. A binding assembly carriage, 18, is born by stands, 14. A base extension, 20, of the carriage, 18, carries the fixed wire feed-fastener heads, 40, and attached fixed first section of wire guide track, 38. Extending from the upper forward extent of the stands, 14, are a pair of pivot axis brackets, 25, holding the pivot axes, 26, which carry the moveable guide track support strut assembly, 28. Extending forward from the center of the strut assembly, 28, is a member, 30, pivotally connected at pin, 32, to piston arm, 34, which is extended and withdrawn by action of the piston, 36. The action of the piston, 36, may be by any means but is preferably pneumatic.

Also extending forward from the center of the strut is mechanical arm, pivotally connected to the carriage at a pin. Incorporated on the mechanical arm are proximity switches. The first proximity switch corresponds to the first, baling, down position of said moveable wire guide track section support strut assembly. The third proximity switch corresponds to the ejection or fully up position of the moveable wire guide track section support strut assembly. The middle proximity switch corresponds to the middle, "ready" position (not shown) between depicted first and second positions. This middle position is a rest position which is far enough removed from the baling station for the moveable wire guide track sections to stay clear of the station and avoid collision with the entry into the station of the next volume of bulk material to be baled. The ready position is not as far removed from the baling station as the second, ejection, position. This rest or "ready" position increases cycle speed.

The depicted embodiment incorporates a two section wire guide track including a first fixed wire guide track section, 38, and a second moveable wire guide track section, 48. It is to be understood that this description is illustrative and not limiting. Accordingly, the present invention may also effectively be deployed in balers with three, four or more wire feed-fastener heads, two, three or more wire guide track sections, or two, three or more guide track support strut positions.

The binding wire enters the apparatus, 10, from the wire supply (not shown) at the wire drive-fastener head, 41, is directed by wire guide track sections, 38 and 48, from and to the head, 40, where the wire is tied into a closed loop.

Figure 2:
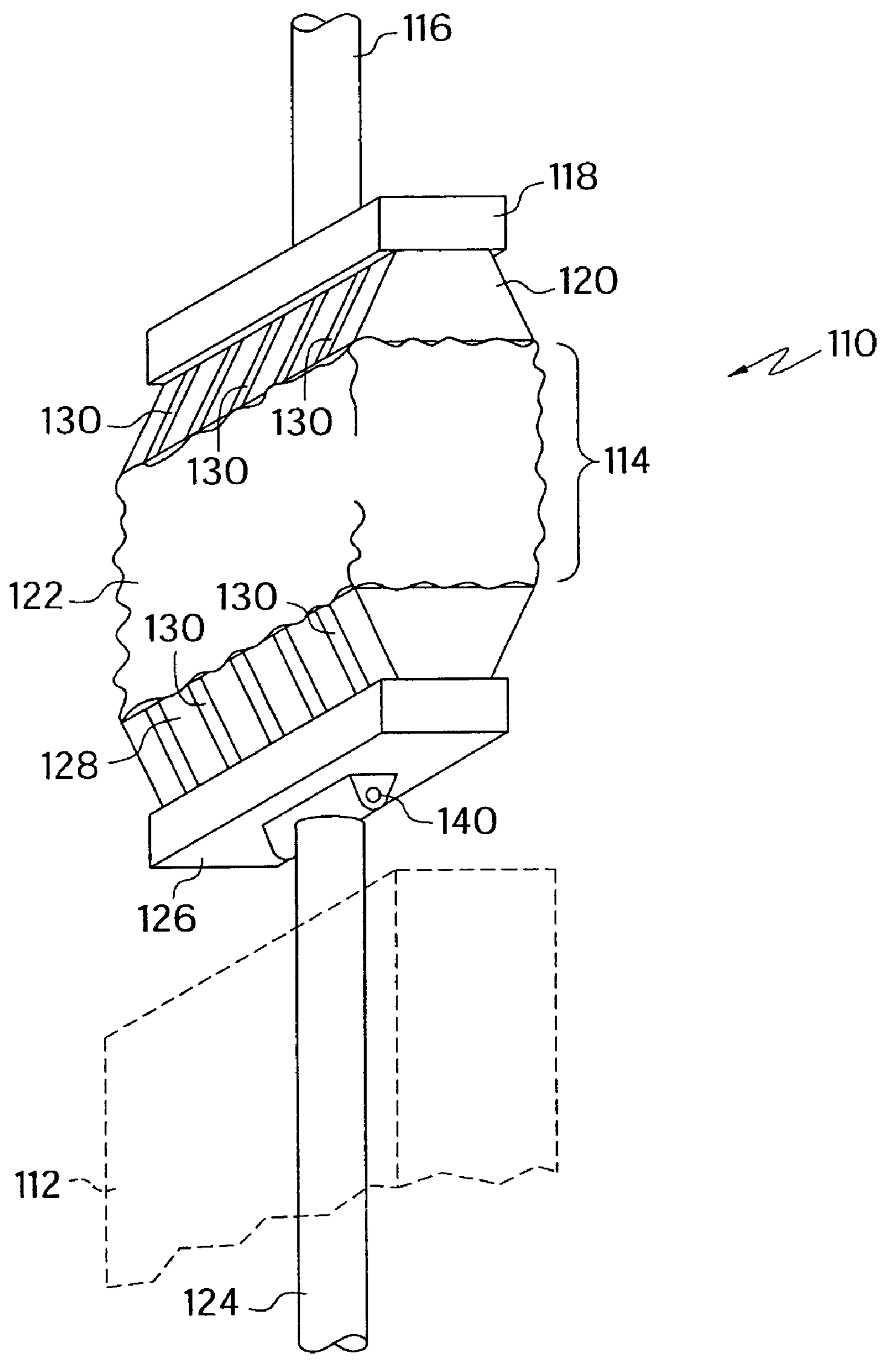
FIG. 2 is an oblique view of the compression apparatus.

FIG. 2 depicts the bale compression apparatus. Most cotton gins in which balers with the present invention are to be deployed already have a "press" in place. Typically a bale compression apparatus will be oriented vertically in order that a volume of material may be introduced into the bale binding station, 114, either from below or above. The present invention may be incorporated in a baler designed to accommodate a compression apparatus oriented in any direction. The embodiment depicted is vertically aligned with the bulk material to be baled entering the baling station from below. Dotted lines 112 indicate the restraining "box" which forms and contains the bulk material under compression. An upper compression block, 118, holds an upper platen, 120, oriented to face the rising bulk material for baling, arrest its upward progress and buttress the material during compression against the force of the rising lower compression elements. Moveable compression shaft, 124, elevates a lower following block, 126, on which is attached a lower platen, 128, which elevates and then compresses a volume of bulk material for baling, 122. Both upper and lower platens contain channels, 130, to accommodate the presence of wire guide track sections therein. The platen faces also incorporate lateral slots (not shown) through which baling wire may be released by the wire guide track sections in order to come into binding contact with the bulk material to be baled.

A first limit switch is engaged when the lower compression apparatus elements have arrived at the bale binding or "up" position. A second limit switch is engaged when the lower compression apparatus is in a position for accepting a new volume of bulk material to be baled. Optionally an intermediate switch may also be incorporated to allow holding the press in an intermediate position for maintenance.

Typical cotton gin compression apparatuses have automatic mechanical means by which a bound bale is ejected from the baling stations as the lower compression shaft, 124, descends after baling. Automatic mechanical ejection means usually incorporate a pivot, 140, between the lower following block and lower compression shaft. A mechanical arm (not shown) tilts the lower following block on the pivot, 140, a sufficient amount for the bound bale to fall from the lower platen onto a receiving area, which frequently has a conveyor belt to convey the bound bale away. Other ejection systems may equivalently be accommodated by the present invention.

Figure 3:
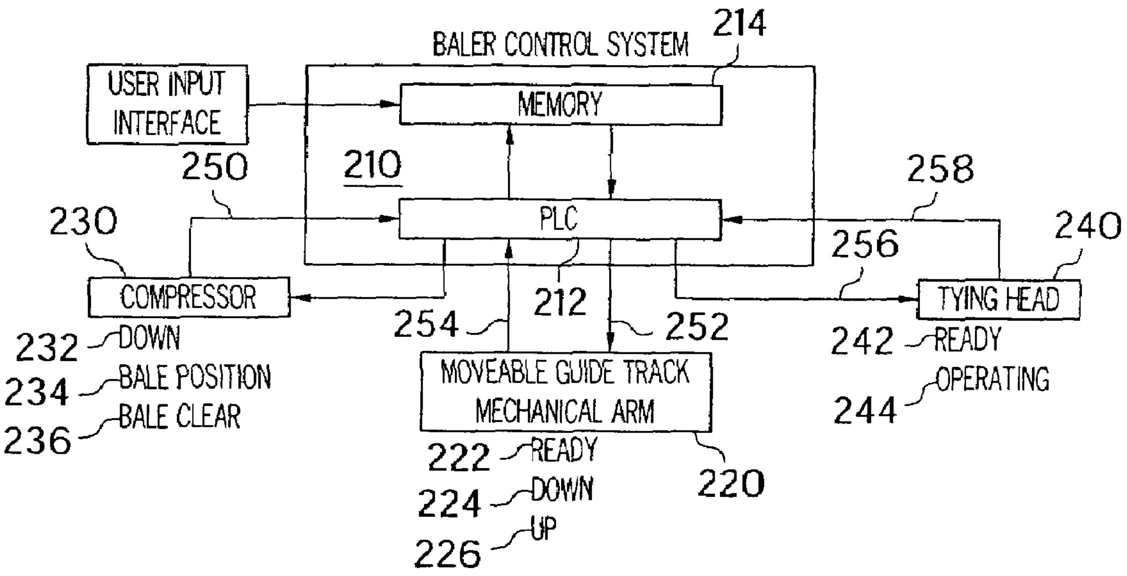
FIG. 3 is a block diagram of the automatic baler control system.

FIG. 3 is a block diagram depicting the automatic baler control system, 210, of the present invention. The automatic baler control system includes a programmable logic circuit, 212, and memory, 214, containing a data structure. The baler mechanical arm, 220, incorporates proximity switches for the ready, 222, baling (down), 224, and ejection (up), 226, positions. The compression apparatus, 230, incorporates limit switches indicating the down 232, baling 234, and bale clear (optional intermediate), 236, position.

Alternatively and equivalently, the compression apparatus control system, 230 may incorporate a separate Programmable Logic Controller and memory of its own, which may interface with the baler control PLC to signal the compressor positions. The present invention is adaptable to whichever of these systems are already in place at a given baling plant or cotton gin.

The wire feed-fastener head, 240 (also called "tying head") incorporates several elements described below. Of these, the ready indicator, 242, is depicted here. The several routines performed by the head are summarized in FIG. 3 as "operating," 244. Completion of those routines is depicted in FIG. 3 as "ready" 242.

Memory stores user input parameter quotients. Parameters that the user may adjust include wire feed speed, wire acceleration and deceleration positions, wire tension, among others. These quotients are downloadable by the PLC to be used in operation along with programmed sequential process instructions.

In operation, a cycle begins with the baler moveable guide track section support strut assembly and its mechanical arm in the ready position, the wire feed-fastener head in the ready position and the compression apparatus in the down position. The compression apparatus lower shaft, following block and platen elevate a volume of bulk material to be baled into the baling station. Upon reaching baling position, the compressor's "bale position" limit switch, 234, signals, 250, the baling machine control system PLC, 212, either directly or by relay through the compression apparatus control system PLC. This signal closes a relay in the baler PLC, completing a circuit which outputs a signal, 252, to the baler moveable guide track section support strut assembly to progress from the ready position to the down or baling position. When the moveable guide track reaches the down position, the guide tack loop completely surrounds the bale and is ready to receive the baling wire. When the moveable guide track reaches this down position, a proximity switch on its mechanical arm signals, 254, to the baler PLC that the moveable guide track is down. This signal closes a relay in the baler PLC completing a circuit which outputs a signal, 256, to the wire feed drive in the tying head to feed the wire. This process is reviewed in detail below.

After baling, the wire feed drive in the tying head signals, 258, the baling control system PLC, 212, that the knots in the baling wires have been completed. This completion signal closes a relay in the baler PLC, completing a circuit which outputs a signal to the moveable guide track support strut assembly to move to the fully up position. Upon reaching the up position, the moveable guide track assembly mechanical arm proximity switch signals the baler control system PLC, closing a relay in the ejection circuit.

The baling machine control system, PLC, 210, ejection circuit signals the compression apparatus or its control system PLC, 230, that the bale is ready for completion. The compression apparatus control system, PLC, 230, signals the press to lower, decompressing the bale, allowing expansion of the bulk material to progress in a downward direction until restrained by the tightening of the baling wires. The lowering of the lower following block, platen and the bound bale riding on top of them automatically engages a conventional mechanical ejection apparatus (not shown). Although cotton gin compressors use a variety of mechanical apparatuses, typically a cam and arm arrangement is used to tilt the lower following block (co-axially with the pivot depicted at 140 in FIG. 2) such that the bale simply falls off the lower platen by gravity. The completed bale is then removed, typically by a conveyor belt, from proximity with the automatic baler. When the completed bale is clear of the path of the transit of the moveable guide track, the baling control system PLC is signaled, either by a proximity switch associated with the conveyor belt, or associated with a corresponding position of the lower compression apparatus. This signal closes a relay in the baler PLC, completing a circuit which outputs a signal to the moveable guide track to descend from the fully up position, 226, to the ready position, 222. The lower compression apparatus then retreats for receipt of the next volume of bulk material to be baled. The compression apparatus then elevates the next volume of bulk material to the baling station, and the cycle repeats.

Figure 4:
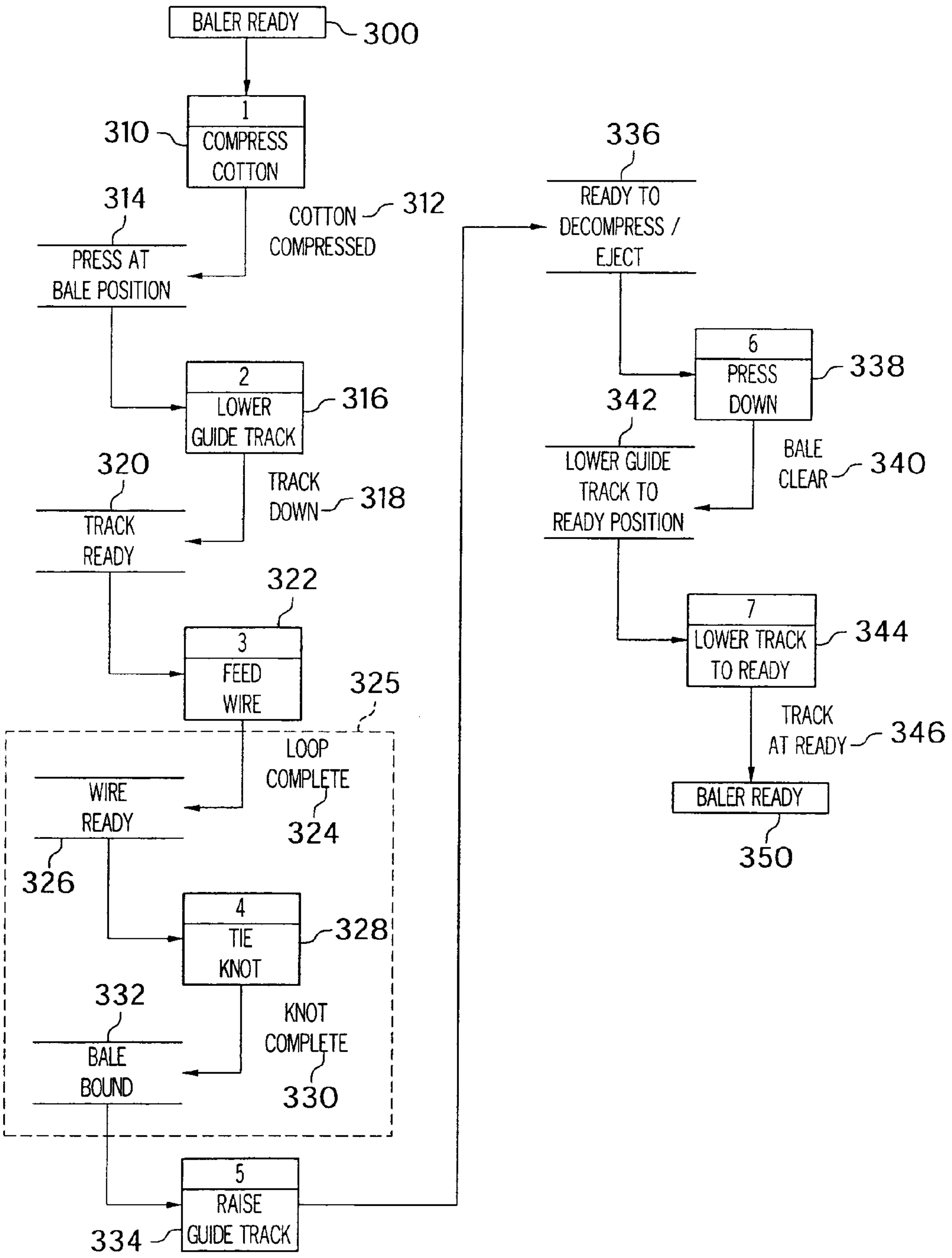
FIG. 4 is a flow chart of the baler control system process.

FIG. 4 is a flow chart diagramming the baling process as governed by the baler control system. Terminal boxes, 300 and 350, indicate terminal positions of the automatic baling machine. The closed boxes indicate a physical process step. The parallel horizontal lines indicate a data status element in the baler control system PLC. The language within the data status parallel lines describes the most recently completed relay circuit in the PLC. Arrows leading from the process boxes to the data status bars are signals from proximity or limit switches on the baling machine. The language adjacent to the signal arrows are the data being signaled to the PLC. Each of these arrows represents a data status signal which closes a relay and completes a circuit described within the data status bars. Arrows proceeding from underneath the data status bars towards the next process step box are output signals that actuate the next process step. These signals are output in response to the completing of a data status circuit which was completed by closing relays in response to input data signals from the previous process box. In this fashion, the control system method governs the step-by-step functioning of the entire baling process as executed by the controlled automatic baler of the present invention.

Beginning terminal box, 300, "baler ready" indicates that the compression apparatus is down, the wire feed head is in the ready position and the moveable guide track is also in the ready position. The compression apparatus compresses the cotton, 310, completing process step number one. Upon reaching its fully up position, a proximity switch in the compression apparatus sends the "cotton compressed," 312, signal to the PLC. This closes a relay in the PLC data status circuit dedicated to the up and "ready to bale" position of the compression apparatus, 314. This circuit outputs a signal to the guide track to lower, 316. Process step number two, 316, is physically lowering the guide track to the full down position. A proximity switch signals, 318, that the track is down to the PLC data status circuit dedicated to the readiness of the track to receive the wire, 320. When the track ready circuit, 320, is completed, it outputs a signal to the wire feed drive in the tying head to feed the wire, 322. When the wire feed physical process step, 322, is complete, a position sensor in the wire feed drive electro-servo motor sends the "loop complete," 324, signal to the PLC. This closes a relay in the PLC circuit dedicated to "wire ready," 326, which outputs a signal to actuate the next process step, "tie knot," 328. Upon completion of the knot, the "knot complete," 330, signal is sent from the fastener head to the data status circuit in the PLC dedicated to completion of the binding, 332. The "bale bound," circuit, 332, upon completion, outputs a signal for the next process step, step number five, "raise guide track," 334.

The wire feed-fastener process has been greatly simplified for the purposes of the flow chart diagram in FIG. 4. The simplified portion of the process is outlined in dotted line, 325. This process is diagramed in detail in the flow chart depicted in FIG. 7.

The fifth process step is to raise the moveable guide track section to a fully up position. When this position has been reached, a proximity switch signals "track fully up," to the PLC. This signal closes a relay in the PLC circuit dedicated to "ready to decompress/eject," 336. Upon this circuit being complete, it signals the compression apparatus to begin lowering, process step number 6. The preferred embodiment of the present invention is consonant with the compression apparatuses found in most cotton gins, which automatically eject a completed cotton bale by mechanical means as the lower compression apparatus descends. In an alternative embodiment, the "track fully up," signal could complete a PLC circuit that not only outputs a signal to the compression apparatus to descend, but also outputs a signal to an alternative ejection apparatus to eject the bale.

Upon lowering, 338, a proximity switch on the lower compression apparatus, or, alternatively, on a bale removing apparatus, such as a conveyer belt, signals "bale clear," 340, to the PLC. Receipt of the "bale clear," signal, 340, by the PLC data status circuit dedicated to return of the mobile guide track to the ready position, 342, causes this circuit to output a signal to actuate the final process step, "lower the track to ready," 344. When the moveable guide track section lowers from its fully up position to its ready position, a proximity switch on the moveable guide track mechanical arm signals that the "track is at ready," 346. This signal completes a data status circuit in the PLC dedicated to actuating the cycle to begin again, which is depicted in FIG. 4 as the terminal status, "baler ready," 350. In actuality, the signal from the PLC upon completion of this circuit would signal the compression apparatus to elevate the next volume of bulk material for baling to the baling station, to begin a new cycle.

Figure 5:
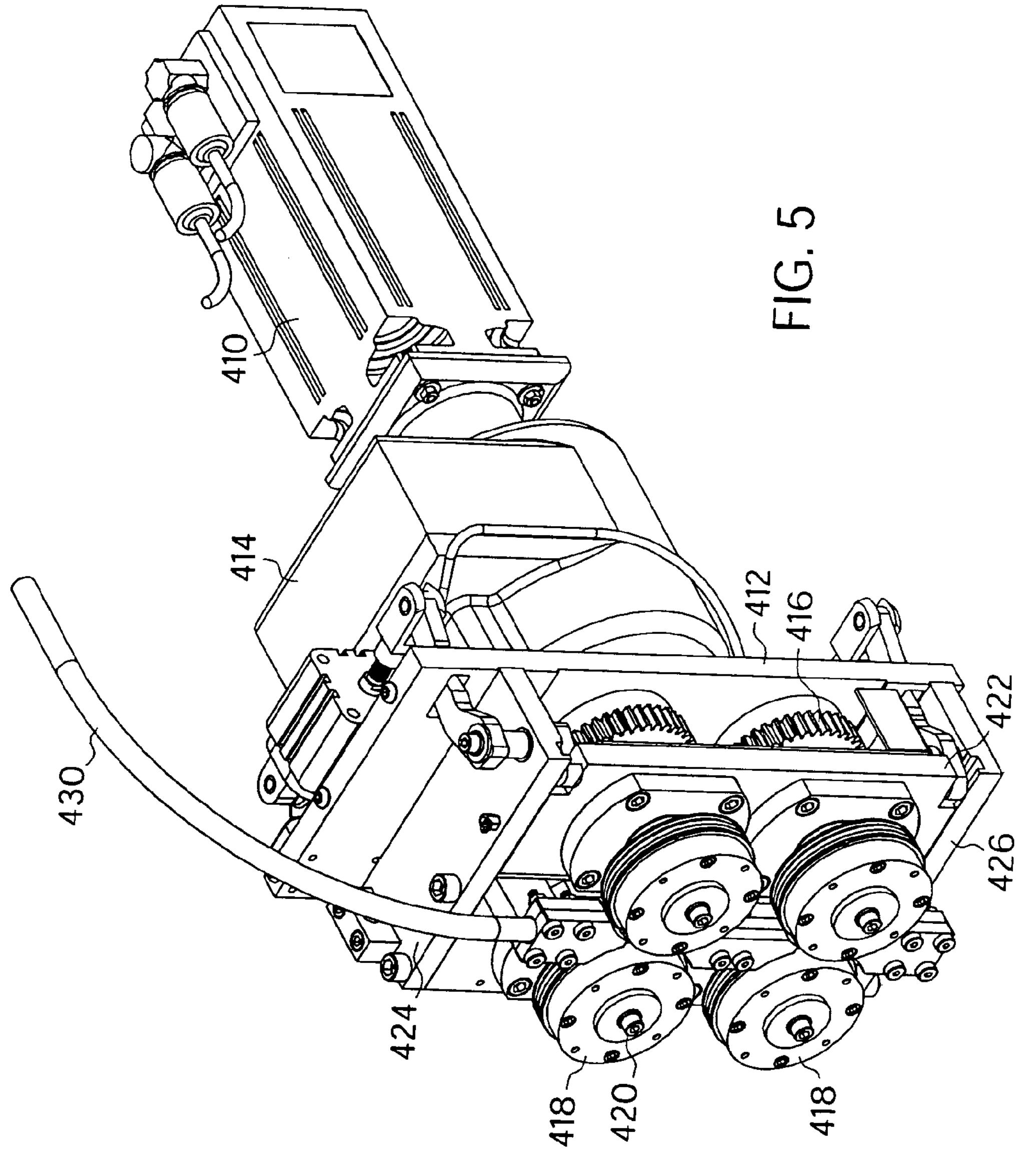
FIG. 5 is an oblique view of a wire feed drive assembly.

FIG. 5 is the wire propulsion unit. Propulsion electro servo motor, 410, is mounted to mounting bracket, 412, through gear reduction box, 414. A through hole (not shown) in mounting bracket, 412, allows the propulsion electro servo motor drive shaft (not shown) to extend through the mounting plate, 412, to allow its engagement with power train distribution gears, 416. Four power train distribution gears (2 visible) correspond to four frictional drive wheels, 418. Four drive wheel drive shafts, 420, rotatably fix drive wheels, 418, to power train distribution gears, 416, through four through holes in drive wheel mounting brackets 422. Mounting bracket, 412, and drive wheel mounting bracket, 422, are fixedly joined by a top horizontal stabilizing plate and a bottom horizontal stabilizing plate, 424 and 426 respectively.

Baling wire (not shown) enters the apparatus through baling wire intake guide, 430. The intake guide directs a progressing baling wire between the drive wheels, 418, where the drive wheels, 418, frictionally propel the progressing baling wire along a pre-determined path. The drive unit is dimensioned to coordinate in close cooperation with a first section of wire guide track oriented to receive the leading end of the progressing baling wire from the drive wheels, 418.

Figure 6:
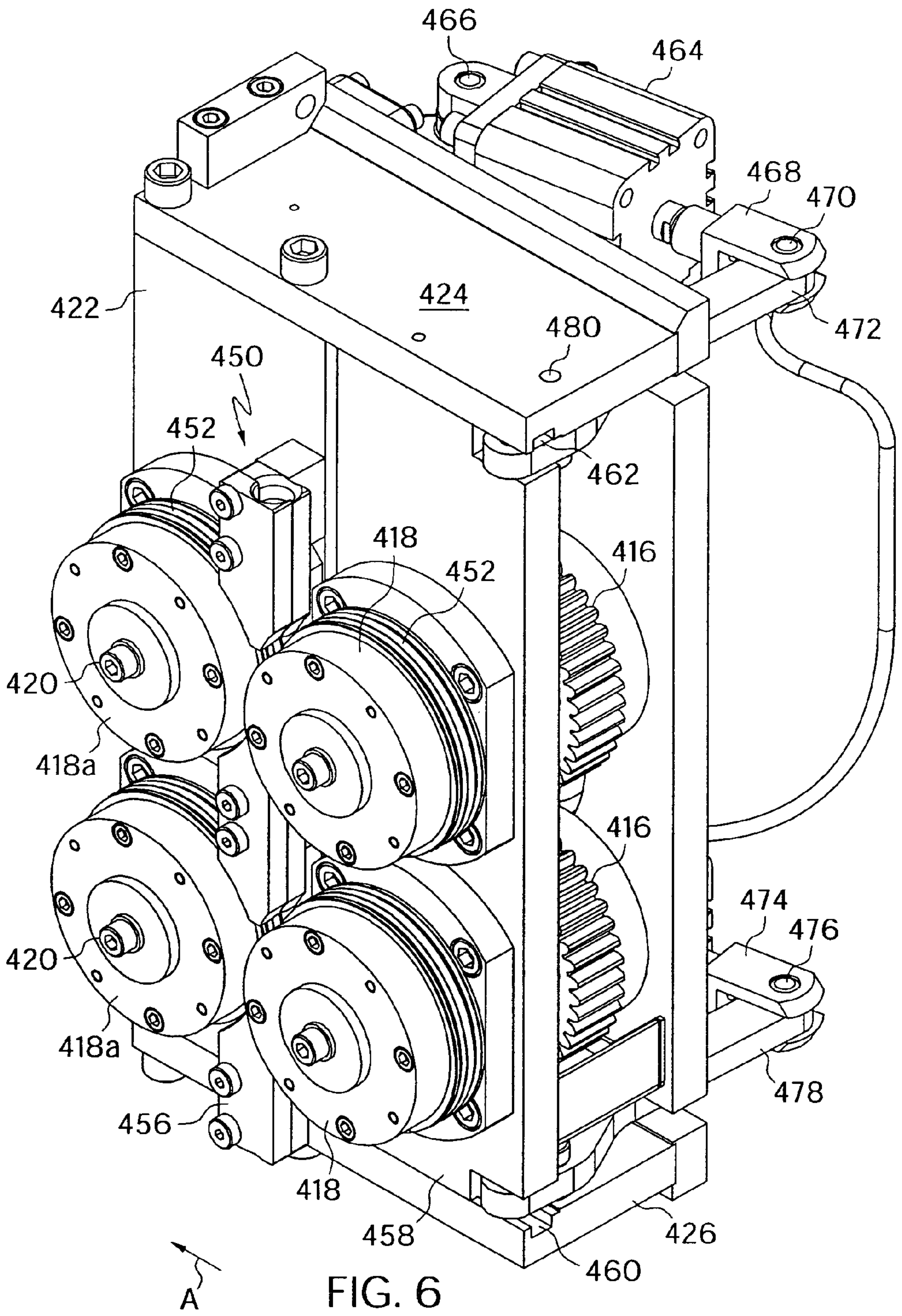
FIG. 6 is an oblique view of the wire feed drive wheels.

FIG. 6 is a closer view of the wire feed drive to be controlled by the present invention. This view shows more closely the drive wheel pressure apparatus. Wire propulsion and reverse tensioning are frictional. Incoming wire enters the wire feed drive unit at wire guide orifice, 450. The guide directs the baling wire between the first and second pairs of wire drive wheels, 418 and 418(*a*). Wire friction surfaces, 452, contact the wire between gaps in wire guide sections 450 and 456. A pre-configured degree of frictional pressure is exerted on the wire by the apparatus depicted in this figure. Left hand drive wheels, 418(*a*) are held stationary by front mounting plate, 422, which is fixed to upper and lower mounting plates of 424 and 426. Right hand drive wheels, 418, are fixedly attached to slideable front mounting plate, 458. Slideable mounting plate, 458, may be moved along the plane of the drive wheels, 418, towards the wire for greater pressure, or away from the wire for reduced pressure. Arrow (A) indicates the direction of greater pressure. Slideable front mounting plate, 458, slides laterally in channels, 460, and 462 in the upper and lower mounting plates, 424 and 426 respectively. The sliding drive is powered by solenoid, 464. Solenoid, 464, is pivotally mounted at its rear at pivoting axis, 466. Solenoid pin, 468, is pivotally mounted at axis pin, 470, to lever, 472. A lower solenoid (obscured) is similarly mounted with a lower drive pin, 474, pivot axis,

476, and lever, 478. Levers, 472 and 478 are pivotally mounted at a fulcrum axis, 480, for the upper lever, 472, and an obscured fulcrum pivot axis for lower lever, 478. Levers, 472 and 478 are pivotally mounted to slideable front mounting bracket, 458, at pivot axes which are obscured in this figure.

In operation, upper solenoid, 464, and lower solenoid drive solenoid pins, 468 and 474 outward, causing a corresponding inward motion in direction (A) of slideable front mounting plate, 458, which applies the pressure of drive wheel pressure surfaces, 452, on the baling wire progressing through and between guide tracks, 450, 454 and 456. In this fashion the pressure exerted by the wire feed drive of the present invention can be maintained while accommodating for different gauges of wire with different diameters, and for wear on drive wheel pressure surfaces, 452.

The drive wheels direct the progress of the baling wire through the tying station in front of the head and into the wire guide track channel. The drive wheels push the wire through the entire guide track circuit and back to the head.

After its circuit through the wire guide track and around the bale, the baling wire reenters the head from the upper fixed wire guide track section. In the preferred embodiment, reaching a pre-configured position signals a deceleration in the speed of the wire transit. This occurs a short distance before its terminal stopping position. Typical wire transit speeds are in the range of about ten feet per second. Decelerating from that speed in the last two to four inches of the wire's transit promotes more accurate positioning of the wire since the limit switch can respond more precisely when the wire travel is slower. This also retards excessive wear on all drive parts from abrupt stops.

Wire guide tracks are designed to guide and hold a baling wire along its proper path and then release the wire when tension is applied to it so that the wire comes into contact with the bulk material bale and tensioning pins. In the preferred embodiment this is achieved by each wire guide track section being comprised of two longitudinal halves, whose inside faces have channels in them through which the wire progresses. The two halves are held together by pressure means, typically springs. The spring pressure is pre-configured to contain the wire within the track during transit, and the wire tensioning pressure to release the wire from the side track upon completion of that transit. Reverse tensioning of the wire to a pre-configured force greater than the track restraining force, releases the wire. Cross sections of the longitudinal halves are depicted in FIGS. 7 and 8.

Figure 7:
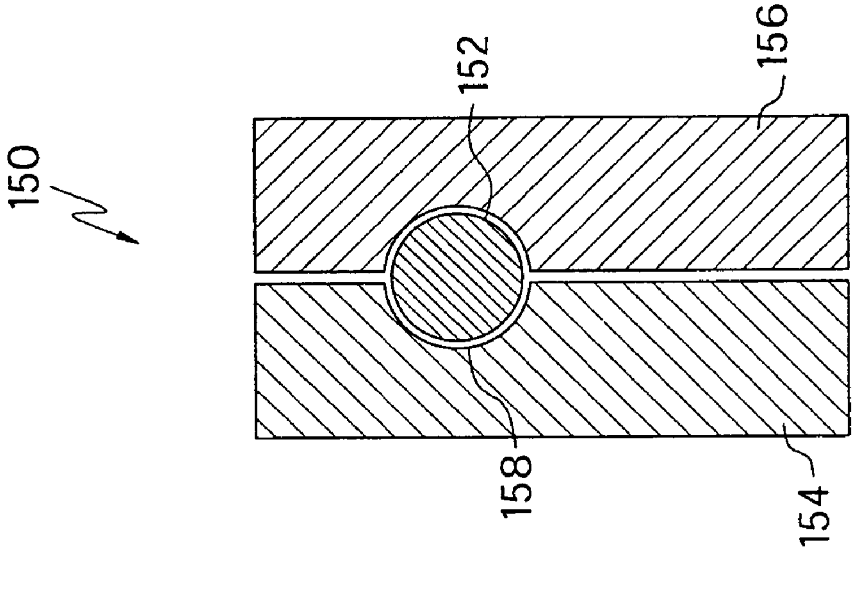
FIG. 7 is a cross sectional view of a wire guide track, closed.

FIG. 7 depicts a cross sectional view of the wire guide track construction, 150, in a closed state for the directing of the wire, 152, about the bale. The first longitudinal half, 154, and second longitudinal half 156, of the track, are separable, and are shown as closed, thereby forming the channel, 158.

Figure 8:
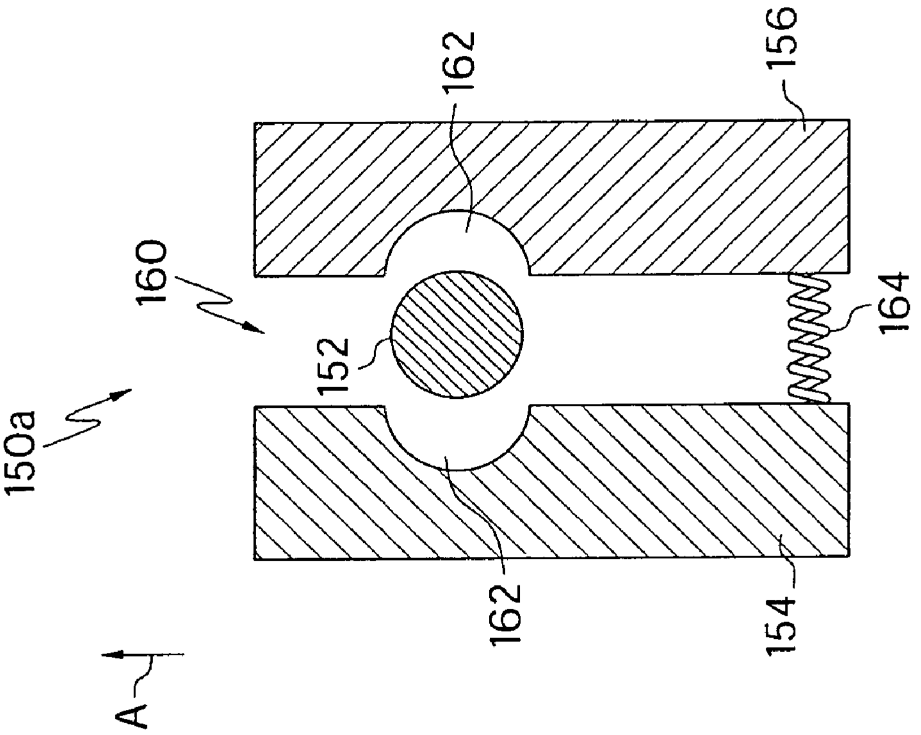
FIG. 8 is a cross sectional view of a wire guide track, open.

FIG. 8 depicts a cross sectional view of the wire guide track construction, 150*a*, in an open state for releasing a closed loop of the wire, 152, in the direction shown by the arrow, A towards the compressed bale (not depicted) from between the halves, 154, and 156, now separated to release the wire through the open separation, 160, between them. Grooves, 162, combine to form the two sides of a channel, 158, when in the closed position. Spring means, 164, mediate the transition of the track between the closed and open positions.

After the entire wire loop is fed out, a tensioning gripper then extends to hold the distal end of the baling wire in a fixed position. Two tensioning pins, 62 and 64 (FIG. 9), are activated by solenoids 944 and 950 to extend into the plane of the bale wire loop and inside the circumference of the loop. After gripping and holding the baling wire, a signal is sent to the drive wheels' servo motor to reverse direction whereupon the drive wheels 418 frictionally tension the baling wire in a direction opposite its original progression around the bale. Tensioning of the wire produces a radially inward pressure on the wire which is designed to be of sufficient strength to overcome the restraining pressure of the wire guide track.

Tensioning the wire is also required for proper operation of the fastener. Upon being sufficiently tensioned to exit the wire guide track, the ends of the wire are ready to be tied by the fastener. During tensioning, the bale wire is drawn tight against the tensioning pins and the bale. The tensioning pins cause the bale wire loop to tension into a position without sharp bends, and thereby allow knotting of the ends with greater efficiency and less likelihood of either weakening the wire or wear to the ends of the wire guide track sections. The placement of the tensioning pins also assures maintenance of the proper wire length.

Figure 9:
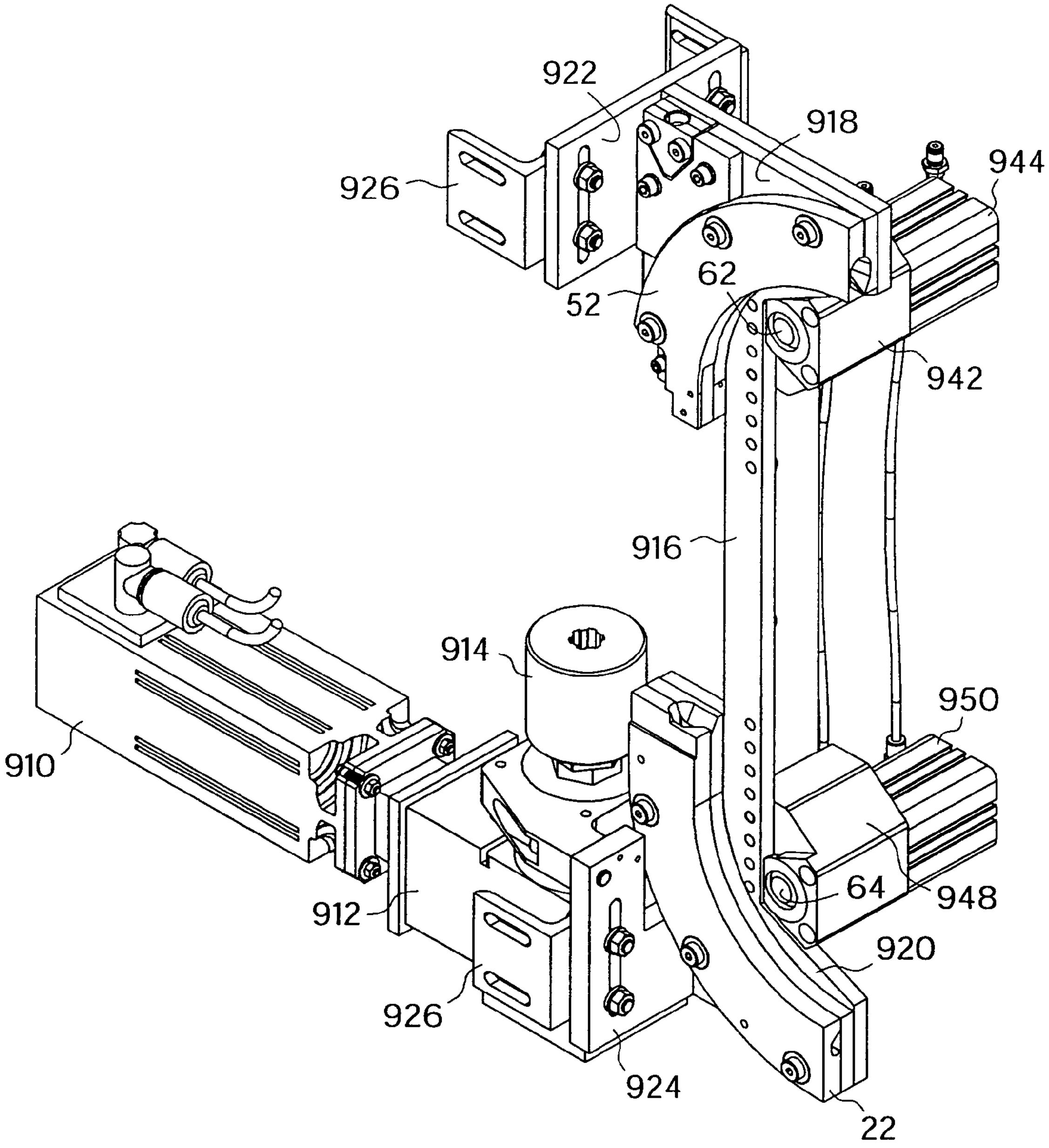
FIG. 9 is an oblique view of a knotter head assembly.

FIG. 9 is an oblique view of some of the other components which the present invention controls in addition to the wire feed drive. The head depicted in FIG. 9 includes a tying head electro servo motor, 910, tying head gear box, 912 and lower tying cylinder, 914, mounted on a head bracket, 916. The wire feed drive depicted in FIGS. 5 and 6 is above this assembly.

The head is comprised of the head mounting bracket, 916, upper mounting plate, 918, and lower mounting plate, 920. Onto the upper mounting plate, 918, is further mounted a carriage mounting bracket, 922. Similarly, another carriage mounting bracket, 924, is fixedly attached to the lower mounting plate, 920. Mounting adjustment angle irons, 926, are fixedly attached to the upper and lower mounting brackets.

The fastener unit, comprised of fastener electro servo motor, 910, gear box, 912, lower tying cylinder, 914, and tying station and upper tying cylinder (not shown) are fixedly attached to the narrow head lower mounting bracket, 924. The first wire guide track section, 22, is mounted to the lower mounting plate, 920. It is oriented with its receiving end upwards, in a position to receive the progressing baling wire lead end from the drive wheels. In alternative embodiments incorporating the present invention, the wire drive unit, shown in FIG. 7, may be mounted to either the narrow head bracket, 916, or the upper mounting plate, 918, in any of a variety of configurations. In order to cooperate with the first wire guide track section, 22, the drive unit must be mounted in such a way that the progressing baling wire will enter the receiving end of the first guide track section, 22.

Finally, it can be seen that the last wire guide track section, 52, is also mounted at the upper mounting plate, 918. Upper tensioning pin, 62, upper tensioning pin mount, 942, and upper tensioning pin solenoid, 944, are also fixedly attached to the upper mounting plate, 918. Likewise, lower tensioning pin, 64, lower tensioning pin mount, 948, and lower tensioning pin solenoid, 950, are all mounted to the lower mounting plate, 920.

A cutter (not shown) cuts the baling wire so that two wire ends oppose one another and overlap in the tying station. The twist knot fastener cylinders rotate a predetermined amount, and, through gear reduction box, 912, produces eight to ten twists in the baling wire ends, knotting them together.

The fastener must generate a knot which is compliant with industry standards for knot tension strength. "The breaking strength of the wire must be not less than 4,350 pounds with a joint strength of not less than 2,600 pounds." Joint Cotton Industry Bale Packaging Committee, 2000 Specifications for Cotton Bale Packaging Materials, Section 1.2.2.3, Approved Materials, Wire Ties, high tensile steel 0.162 inch diameter, 200 KSI wire.

The ends of the knot have been held, and, upon completion of the knot, are released, in a known fashion by mechanical grooves in the tying cylinders. The baling control system PLC signals the drive wheel servo to rest after the baling wire knot is tied. The PLC signals the servo motor to counter rotate the tying cylinders, after the wire has been released, so that the tying cylinders return to their original, ready position. The baling control system PLC also signals the tensioning gripper to be released and the solenoids to retract the tensioning pins.

The baling control system PLC receives the tying servo complete signal as the signal that the knot is tied. This corresponds to the tying head "ready" signal, 242, in FIG. 3 and the "knot complete" signal, 330, in FIG. 4. Upon receipt of this signal, the baling control system PLC signals the compression apparatus PLC to release compression, and, thereby eject the bale. This cycle repeats.

Figure 10:
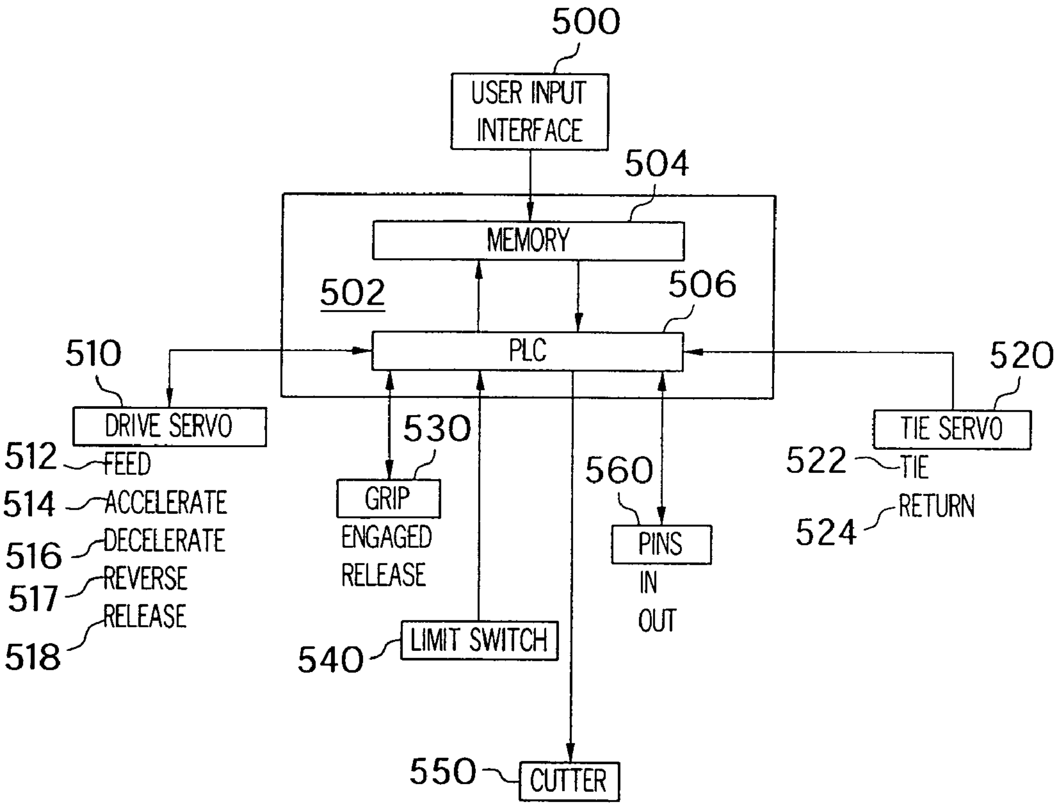
FIG. 10 is a block diagram of the wire feed-fastener head control system.

FIG. 10 is a block diagram of the wire feed drive, tying head portion of the control system. The baling control system of the present invention has separate PLC, 502, control for each of three to six individual heads. This allows advantages such as shutting down an individual head upon malfunction, and continuing the baling process with the operating heads. The PLC, 502, is comprised of a memory, 504, and logic circuit, 506, controllable by a user interface, 500. Each head has two separate control axes; the drive wheel servo, 510, and the tying servo. It is within the scope of the present invention to control both of these in several equivalent ways, including separate PLC chips for the separate servo motors, distinct data structures for each in one PLC, or an integrated data structure. Additionally, the PLC receives and sends signals to a gripper, 530, with a gripped position and a released position, tensioning pin solenoids, 560, with an extended position and a retracted position. The PLC is wired to receive signals from a limit switch, 540. The PLC is programmed to output an actuating signal for the wire cutter, 550. The PLC further controls the drive servo, 510, by outputting actuating signals for wire feed, 512, wire acceleration, 514, wire deceleration, 516, tension reverse, 517, and tension release, 518. The PLC further controls the tie servo by outputting actuating signals for rotating the tie cylinders to the tie the knot, 522, and reversing the tie cylinders to the ready position after mechanical release of the knot, 524.

Figure 11:
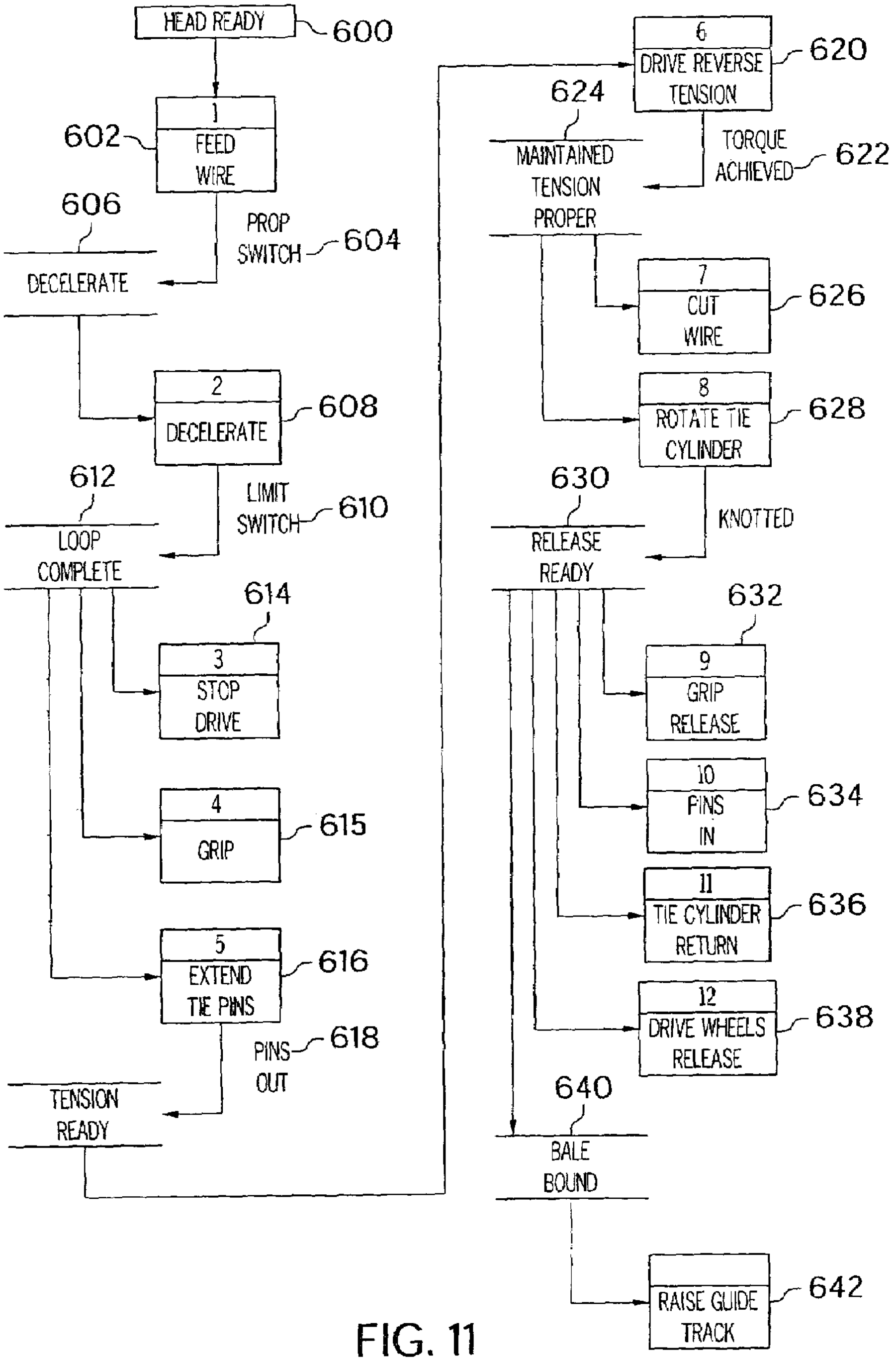
FIG. 11 is a flow chart of the wire feed-fastener head control system process.

FIG. 11 is flow chart diagramming the wire feed-fastener head process. In operation, the baling cycle begins with both the drive wheel servo and the tying servo having signaled a permissive "ready" signal, 600, to the baling control system PLC. Having received the proximity switch signal from the moveable guide track mechanical arm that the moveable guide track section is in baling position, the baling system PLC signals the drive wheel servo, 602, to drive the wheels and frictionally propel the baling wire through the guide track.

When the leading edge of the wire reaches a pre-configured position, 604, a signal is sent to the deceleration circuit of the PLC, 606, and closes a relay therein. The ready to decelerate data status circuit being completed it outputs a signal to the wire feed drive servo to decelerate, 608.

In the same fashion, the wire may optionally be accelerated at a pre-configured position near the beginning of the wire transit loop.

After completing its circuit around the bale the leading end of the baling wire arrives at the limit switch, 610. In the preferred embodiment this "limit switch" is the signal from the electro servo motor that a pre-configured number of rotations of its drive shaft, corresponding to the desired bale wire length, has been reached. The limit switch signal is received by the "loop complete" data status circuit, 612, which outputs a signal to the drive wheel servo to halt, 614. The "loop complete" data status circuit, 612, also signals the gripper to grip the wire, 615, and the tensioning pin solenoids to extend the tensioning pins into the plane of the bale wire loop, 616.

Next the "loop complete" circuit, 612, after waiting a pre-configured time for the tensioning pin to extend, 618, signals the drive wheel servo to reverse direction and frictionally tension the baling wire, 620. The baling control system memory has been pre-configured to relate predetermined desired tensions with corresponding torques generated by the drive servo, which in turn corresponds to predetermined electric servo current amperages. The PLC receives a signal from the drive wheel electric servo motor that it has reached the amount of current corresponding to the tension in the wire required to release the wire from the retaining force of the wire guide track. The control system continues the amount of current necessary for the reverse frictional drive to maintain the proper predetermined tension on the wire during tying. Upon the wire's release from the wire guide track and consequent contact with the bale and tying pins, the drive wheel electric servo motor signals the baling control system PLC that current demand increased indicating that the pre-configured torque has been reached, 622, as the electric servo continues to tension the wire against the bale and tying pins. The baler control system memory download configures the baling control system PLC to maintain, 624, the drive wheel electric servo current at a predetermined level, in order that the desired, predetermined tension in the wire is maintained between the tensioning gripper at the distal end of the baling wire and the drive wheels, frictionally gripping and pulling the proximal end of the wire. Upon the receipt by the baler control system PLC that this predetermined tension has been maintained for a predetermined amount of time, typically a fraction of a second, the baler control system PLC signals, 626, the wire cutter to actuate and cut the baling wire between the wire drive wheels and the bale wire dispenser (not shown).

Next the "maintained tension" data status circuit, 624, signals the control system PLC to actuate the tying cylinder servo, 628, to affect tying a knot in the bale wire ends. The tying head servo ties the knot in a known way through rotation of cylinders which produce eight to ten twists in each bale wire end. Through a gear box reduction factor between eight and ten to one, the knot is tied with less than ten rotations of the tying cylinder heads. Typically approximately one rotation of each of two tying cylinders heads is required.

The present invention affords precise control of the tying cylinders through a torque monitoring switch which compares the amount of current amperage being used by the tying cylinder servo motor to a pre-configured amount in the control systems memory. Moreover, the servo drive shaft position for the tying cylinder is received by the baling control system memory on a constant basis, so that the precise position of the tying cylinders is always known. The baling control system memory, optionally and equivalently, has a user interface where by the user can both monitor and change the precise positioning of the tying head cylinder to optimize speed and minimize weakening of the wire during tying.

Prior art fasteners were unable to operate as efficiently as the fastener torque, speed and position control of the present invention. Prior art tying heads were subject to rotating too quickly, which rotational speed would generate heat and consequent metal fatigue in the tied portion of the wire. Prior art tying heads would lose cycle speed if preset to avoid metal fatigue with slower, but imprecise rotation speeds. Precise control of knot variables is further controllable with the present invention by constant precise monitoring of the tying cylinder position so that the degrees of rotation may be controlled with precision. This is achieved by combining the precise, preferrably to within 2 degrees, control of servos available through their constant monitoring of their drive shafts, together with PLC control and user variable manipulation of positions desired through PLC downloadable memory. This combination also allows precise control of position of the wire during feeding, and, in further combination with PLC timers, of wire feed speed and tying cylinder rotation speed.

After the knot is tied, the tying head servo motor signals the position of the tying cylinder corresponding to a finished knot to the baling control system. The knotter automatically releases the wire in a known, mechanical fashion. The "release ready" data status circuit, 630, then cuts off current to the drive wheel servo motor, 638, releasing the wire and returning said drive wheel electric servo motor to the original "ready" position. The tying cylinder electric servo is rotated in the reverse direction of the tying direction, the same number of degrees as it was rotated in the tying direction, to also return the tying cylinders to the ready position, 636. The tensioning grip is released, 632, and the tensioning pins withdrawn, 634, from the plane of the bale wire loop. This group of signals together are the "bale bound" data status, 640, and correspond to the "done" or "ready" signal, 242, described in FIG. 3. Thereupon the "release ready" circuit, 630, signals the moveable wire guide track to move to ejection position, 642, the compression apparatus PLC to release compression and the ejection arm to eject the bale from the baling station. This cycle repeats.

This disclosure is illustrative and not limiting and accordingly, the control system apparatus and processes described herein may be practiced entirely through the use of physical relays and timers in combination with one or more programmed PLCs, or with other CPUs, as in a laptop. The preferred embodiment, however, uses a Programmable Logic Controller. Use of a PLC also incorporates actual physical relays, switches and sensors for input, and output signals to actual switches. However, internal relays used to encode and store data reflecting the status of the process steps are internal software processes executed through the use of bit locations in registers. Also, the control system of the present invention sequentially executes the process described herein. In order to effect this step-by-step process, delay instructions are often used. These two take advantage of the nature of the PLC software operation.

PLC's work by continually scanning a program. In a broad sense, PLC operation sequentially scans input status, executes programs and updates output status, then repeats. It is a complex series of "if X, then Y," commands, repeated in millisecond cycles. The preferred embodiment of the present invention is a program for control of a bulk material baler sequentially executed according to the updated data status reflecting the progress of the process.

A variety of PLCs are available on the market, all of which are programmable according to dedicated software. The preferred embodiment of the present invention uses a Telemekanique Lexian PLC. PLC software programming is typically developed with the use of dedicated design schematics, such as that illustrated in FIG. 10. The software apparatus is programmable to function in a manner analogous to the relay and circuit format familiar to systems control engineers. Accordingly, the software design schematic depicts two vertical lines on the left and right hand margins of the page. The left handed vertical line, 700, represents a positive terminal and the right hand vertical line, 710, represents ground. The horizontal line connecting them, 712, called a "rung," represents a circuit between a positive terminal and ground. This circuit may incorporate actual physical switches and signals, or internal software representations of relay switches and signals for internal data transfer, or both. In operation, the PLC scanning process proceeds from top to bottom and left to right. Accordingly, each rung is taken in turn, from top to bottom. Also, each relay or other instruction on an individual rung is taken in turn from left to right. In FIG. 10 a single rung is displayed. A programmer's comment appears at the top, 714, indicating that this rung is responsible for insuring that the lower compression apparatus, referred to as "the press" is in the fully raised position before the next step of the process begins.

Moving along the rung from left to right, the first "relay," 716, indicates that a previous strapping cycle has been completed, and this relay is therefore closed. The forward slash indicates that this relay is closed. The "% m7" is an address for the register containing the bit representing the information that a previous strapping cycle is complete.

Each of these relay representations is closed when a "1" appears in the data register at the given address, in this case either "% m5", "% m45" or "% m6". If this software data structure represents an open relay, a zero bit will occupy that address in the register. When there is a path across a horizontal rung composed entirely of "1s," that is, "true" signals, the software represents a completed circuit and actuates an output signal.

In order for any next step of the process to be undertaken, the previous step must be completed, so that step completion closes a circuit. That is, if a path of register addresses with a "true" bit stored, representing a path of closed "relays," is complete across a rung, then the PLC data status for that step is that the step is complete. The rung outputs an appropriate data signal to the next rung in the PLC, or outputs a signal to the physical baler actuating the next step.

Figure 12:
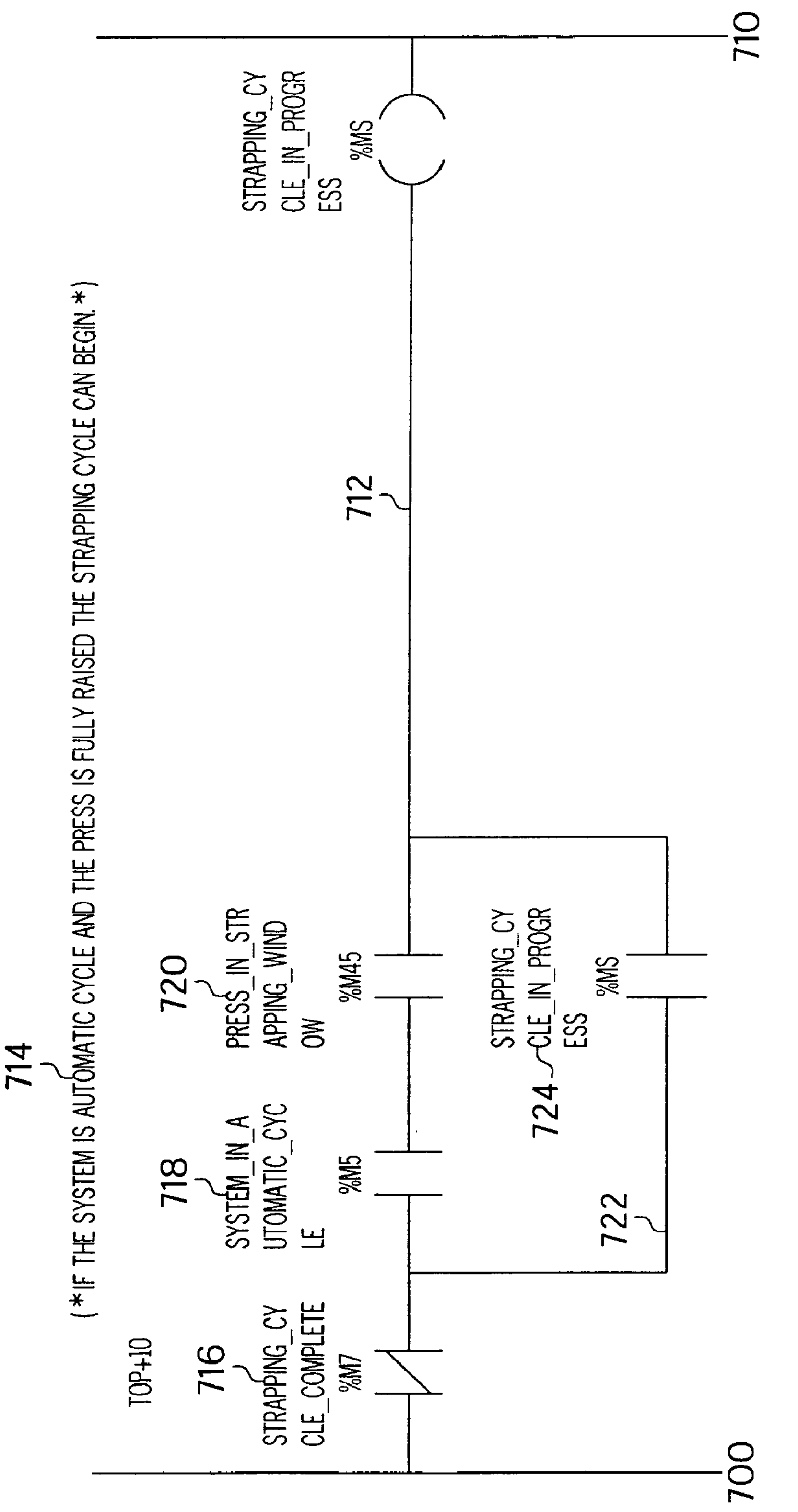
FIG. 12 is an illustration of PLC source code layout.

FIG. 12 depicts the rung for the data status of the compression apparatus, the "press," being up. The top horizontal line, 712, is the path taken on the first scan after the "press up" signal has been received. The second relay representation, "system in automatic cycle", 718, verifies that the user has set the control system to automatic, as opposed to manual. (There is a manual override for the control system for repair, maintenance or other atypical situations.) The next relay on the top horizontal line of the illustrated rung represents, "press in strapping window," 720. "Strapping" is synonymous with baling. The "strapping window" is synonymous with the lower compression apparatus being in the fully up position and ready for baling. These registers, or "relays," are in series, and so are read as an "and" control; both must be true to signal the next step.

The relay represented on the bottom rung, 722, "strapping cycle in progress," 724, represents a closed relay that also allows the entire circuit of this rung to be closed, also allowing a further step to be taken. The bottom rung, 722, represents a parallel circuit. This functions as an “or” instruction, whereby the circuit may be completed and the next step initiated if either the bottom horizontal line, 722, or the top horizontal line, 712, has all its relays closed. The rungs are “permissive” in nature. That is, they must be closed or true continuously throughout subsequent scans while the baling progresses, until the cotton is baled and a new cycle begins. Hence, the parallel lower path, “strapping cycle in progress,” also completes the circuit and permits the baling to continue subsequent to the closing of the top line of the rung, 712, which initially indicated that the press is up and baling is permitted.

Typical PLCs available on the market, including the Telemekanique Lexian PLC of the preferred embodiment, are capable of on the order of 200 different functions. The functions utilized in the present invention include incremental moves, blend moves, absolute moves, homing, read sercos ID numbers, write sercos, fast stop, halt, setting accelerations and setting decelerations. Prior art balers could not control baling with the precision of the combination of the present invention. For example, prior art balers could not compensate for wire slippage. The present invention can do so through the use of the “incremental move,” which measures position from a last measured position, and not from an original “home” position as is used by “absolute moves.”

The address symbols include “%” which represents a bit address in a memory register. “M” is an internal bit dedicated to completing information registers within the software. “Q” represents a physical signal output. “I” is input data.

Figure 13:
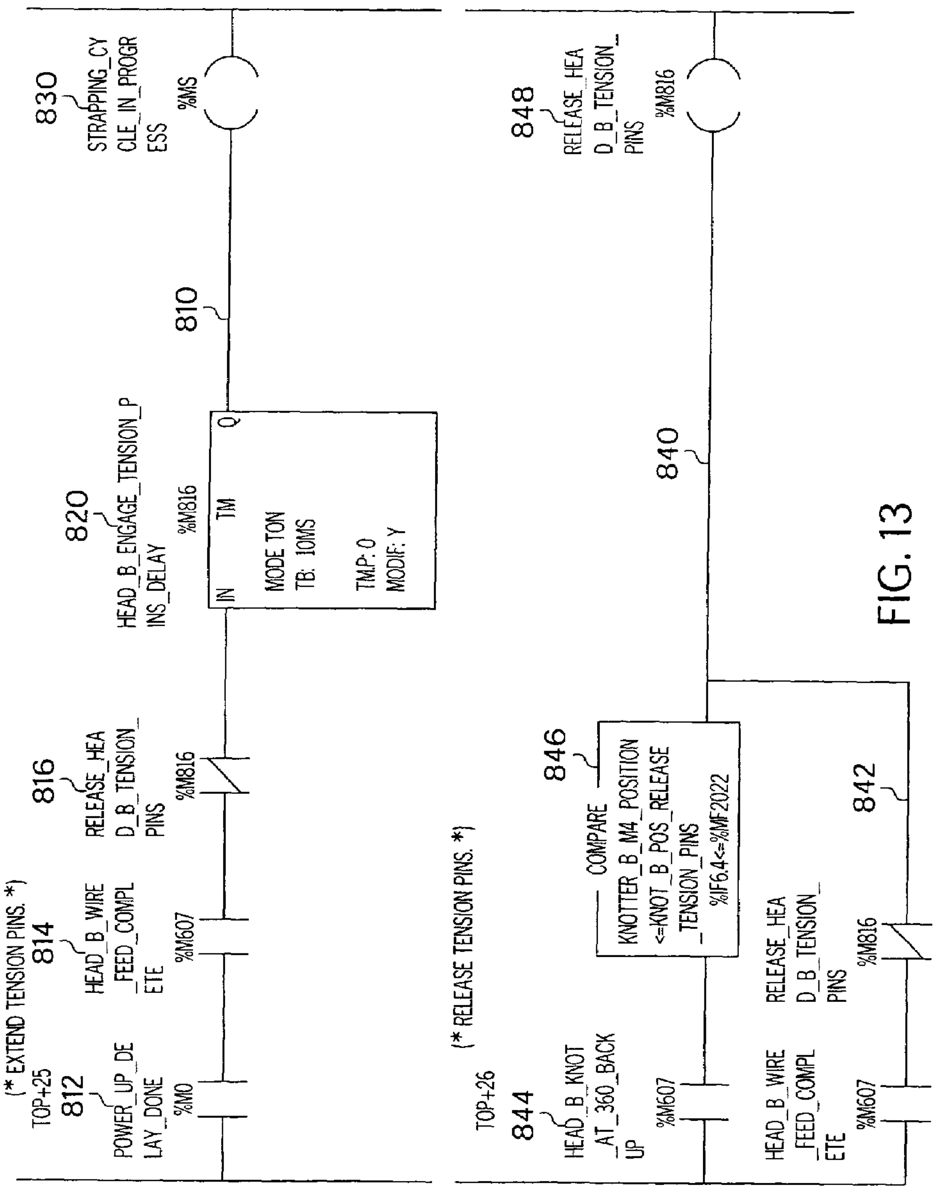
FIG. 13 is another illustration of PLC source code layout.

FIG. 13 represents two more illustrative rungs which also depict further capabilities of the PLC software. The top rung, 810, is an instruction to extend tension pins. The first represented relay, 812, verifies that tension pin solenoid power is ready. The second represented relay represents that the wire has been fed through its complete loop, 814. The third relay, 816, is already closed, and indicates that the pins remain at their last known position, the “released” position, which corresponds to the physically retracted position of the tension pins. The next element on the rung, 820, is a delay timer, set at 10 milliseconds. Delay timers are used throughout the PLC programming to ensure that actions do not occur simultaneously, but rather occur sequentially. A delay is actuated in the completion of a particular rung’s circuit. The input data representing closed relays, that is the “true” data stored at the registers representing each relay on the rung, have been stored on an initial scan. The circuit is read as complete and output is executed on the following scan. Because the delay is 10 milliseconds and the scan time is 500 to 1,000 milliseconds, the circuit will be read as closed and output achieved on the next sequential scan. On the top rung, 810, the output symbol, “head B tension pins solenoids,” is a physical output signal, represented by the letter “q,” to send current to the solenoid in order to extend the tension pin.

The bottom rung of FIG. 13, 840, actuates the “release” or retraction of the tension pins. The top horizontal line of this rung, 840, represents the initial signal to retract the pin. The bottom horizontal line, 842, represents the continuing status of the tension pin as retracted, in order to maintain that retracted position and the retracted position data status throughout the execution of the other sequential steps on other rungs of the PLC scan. The top horizontal line of the rung, 840, begins with completion of the previous sequential step, i.e. that the “head B knot at 360 backup” position, 844. That is, the tying cylinder has been returned to its ready position after the previous knot was tied. The next step in series represents the compare function of the PLC software, 846. The data register verifying that the knotting cylinder is in the desired position is compared with the tension pin register. This ensures that the tying cylinder has been returned to a position which safely allows release of the tension pins. This safety step is added because the user can control the number of degrees the tying cylinder advances and returns. Upon completion of this circuit, the output is given on the right, 848, to release the tension pins.

In the preferred embodiment of the present invention all PLC to apparatus signals are communicated by means of a fiber optic link such as a Sercos circuit manufactured by Telemakanique Lexian. Use of fiber optic linking in the preferred embodiment of the present invention saves space in the apparatus as the fiber optic linking cables and apparatus occupy a smaller volume than traditional electrical cables. Moreover, use of the fiber optic link in the preferred embodiment of the present invention eliminates sensitivity to power surges and electrical interference which cause inefficiencies in prior art apparatuses and alternative embodiments.

The preferred embodiment of the present invention may also include a safety mat below the moveable guide track and/or carriage. A worker standing in this hazardous place would close a circuit in the mat which would prevent operation of the baler until the worker stepped off the mat.

The preferred embodiment of the present invention incorporates alarm and/or arrest triggers responsive to malfunctions such as a wire caught in the wire guide track. This trigger is actuated by the PLC of the present control system monitoring the torque of the drive electro-servo motor by means of monitoring current amperage levels. Alternatively, the trigger is affected by comparing torque levels to position information. That is, if the torque reaches the level expected at the end of the bale wire loop at a position before the end, the alarm and/or arrest is triggered because the wire has jammed.

Alternative embodiments of the present invention would equivalently control torque, speed, position and other process variables in automatic baling machines using a hydraulic, pneumatic or other drive systems, either through monitoring and comparing with a preconfigured memory, pressure values or other values.

The preferred embodiment of the present invention includes three guide tracks, feed drives and fasteners abreast, mounted on a moveable carriage that translates along a boom. In such an embodiment, the carriage movement is mediated by an electric servo motor, whose timing and position are also controlled by the control system. After first, third and fifth loops are complete, the system translates the carriage 9 and ¼ inches laterally for execution of second, fourth and sixth loops. An alternative embodiment controls a configuration having six guide tracks, six feed drives and six fasteners abreast.

The preferred embodiment of the present invention has a memory which receives and stores variable parameter configurations input by a user and downloads them to the PLC for process step control. The memory may also record historical data from completed processing such as number of bales bound, feet of wire used, cycle time, and the like.

In the preferred embodiment, each feed drive fastener head is independently controlled, as is the carriage servo motor.

The term “strap” is a recognized industry term of art understood by those of skill in the art to mean generically wire, metal bands, plastic bands or other types of straps. A "strap fastener" is therefor recognized to mean a wire knotter, a band welder, a band crimper, or any other device for attaching one end of the strap around a bale to the other end. Typically, strap fasteners require some overlap of the portions of the strap near each end, so that there are working portions of the ends of strapping to knot, in the case of wire, or crimp, in the case of banding. The preferred embodiment of the present invention uses "straps" that are wire, most preferedly 10-guage wire. Those of skill in the art will understand from the use of the term "strap" that the scope of the present invention applies equivalently to both wire, metal bands, plastic bands and any other kind of binding strap used in bulk material baling.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A data structure embodied in a machine readable storage medium controlling a bulk material baler comprising:

an instruction to a moveable guide track section support strut assembly to move from a removed position to a closed position when a compression apparatus advances a volume of bulk material to be baled into a compressed position in a baling station;

an instruction to an electro-servo motor of a bale wire feed drive to feed a predetermined length of bale wire into a guide track loop when said moveable guide track section support strut assembly reaches said closed position, wherein said predetermined length of bale wire is determined by a number of rotations of a drive shaft of said electro-servo motor of said bale wire feed drive;

an instruction to a wire cutter to cut a proximal end of said predetermined length of bale wire;

an instruction to a wire knotter to knot a proximal end portion of said predetermined length of bale wire together with a distal end portion of said predetermined length of bale wire;

an instruction to said moveable guide track section support strut assembly to move to said removed position after said proximal and distal end portions of said predetermined length of bale wire are knotted together; and an instruction to said compression apparatus to release from said compressed position after said moveable guide track section support strut assembly is moved away from said compression apparatus.

2. The data structure of claim 1 further comprising;

an instruction to a tensioning gripper to grip a distal end of said bale wire length when said bale wire length distal end completes transit of said guide track loop;

an instruction to said bale wire feed drive to reverse drive direction for tensioning said bale wire length after said tensioning gripper secures said bale wire length distal end; and an instruction to said bale wire feed drive and to said tensioning gripper to release after said bale wire end portions are knotted.

3. The data structure of claim 1 further comprising;

an instruction to at least one tensioning pin to extend when said bale wire length distal end completes transit of said guide track loop; and an instruction to said at least one tensioning pin to retract after said bale wire length end portions are knotted.

4. The data structure of claim 1 further comprising;

an instruction to at least one knotter tie cylinder to reverse for return to a ready position after said bale wire length end portions are knotted together.

5. The data structure of claim 1 further comprising;

an instruction to an ejection apparatus to eject a bound bale from said baling station alter said moveable guide track section support strut assembly reaches said removed position and after said compression apparatus decompresses.

6. The data structure of claim 1 further comprising;

an instruction to said compression apparatus to begin a next cycle after a bound bale has moved away from said compression apparatus and said moveable guide track section support strut assembly.

7. The data structure of claim 1 further comprising;

an instruction to a moveable guide track section support strut to move from a ready position to a closed position when a compression apparatus advances a volume of bulk material to be baled into a compressed position in the baling station;

an instruction to said moveable guide track section support strut assembly to move to an eject position after said bale wire length end portions are knotted together and released; and an instruction to said moveable guide track section strut assembly to return from said eject position to said ready position after an ejection apparatus ejects a bound bale from said baling station.

8. The data structure of claim 1 wherein said data structure stores strut position data recording a position status of said moveable guide track section support strut assembly and wherein said data structure receives said strut position data from at least one proximity switch for signaling said closed position, and at least one proximity switch for signaling an eject position, said switches being in communication with said data structure.

9. The data structure of claim 1 further comprising an instruction in said data structure to decelerate said predetermined length of bale wire about 2 to 4 inches proximal to a tensioning gripper.

10. The data structure of claim 1 further comprising an instruction in said data structure to stop said predetermined length of bale wire at a pre-configured length.

11. The data structure of claim 1 further comprising an instruction in said data structure that said predetermined length of bale wire move at a preconfigured speed, said pre-configured speed being between 15 and 100 inches per second.

12. The data structure of claim 1 further comprising an instruction in said data structure that a pre-configured tension be applied to said predetermined length of bale wire, said pre-configured tension corresponding to a pre-configured current amperage of said electro-servo motor.

13. The data structure of claim 1 wherein said data structure signals an alarm and a shutdown at a current monitor amperage level predetermined to correspond to an arrest of progress of the predetermined length of bale wire through the guide track loop.

14. The data structure of claim 1 wherein said data structure signals an automatic alarm and a shut off at a current monitor amperage level predetermined to correspond to an improper tie speed.

15. The data structure of claim 1 wherein said data structure signals an automatic alarm and a shut off at a current monitor amperage level predetermined to correspond to an improper tie torque.

16. The data structure of claim 1 further comprising an instruction in said data structure to maintain a preconfigured torque for a tying cylinder, said torque being within a range between 0 and 54 inches per pound.

17. The data structure of claim 1 wherein said instruction in said data structure to feed a predetermined length of bale wire is responsive to a set of user programmable settings for user control of said bale wire length.

18. The data structure of claim 1 further comprising an instruction in said data structure constraining current flow to a tying cylinder propulsion electric servo motor, said motor driving said wire knotter, wherein said constraining current flow is responsive to a set of user input parameters for pre-configuring torque.

19. The data structure of claim 5 wherein said ejection apparatus has a proximity switch to signal a return to a ready position after ejection of the bound bale of bulk material from said baling station.

20. The data structure of claim 1 further comprising a memory for storing a plurality of process variable configurations input by an operator and downloadable for operative application by a programmable logic controller.

21. The data structure of claim 1 further comprising a memory for storing historical process data.

22. The data structure of claim 1 further comprising:

an instruction to said electro-servo motor of said bale wire feed drive to decelerate before said predetermined length of bale wire is completely fed into said guide track loop.

23. The data structure of claim 22 wherein said instruction to decelerate is given during the last two to four inches of transit of said predetermined length of said bale wire through said guide track loop.

24. A data structure embodied in a machine readable storage medium controlling a bulk material baler comprising:

an instruction to a moveable guide track section support strut assembly to move from a ready position to a closed guide track loop position when a compression apparatus has advanced a volume of bulk material to a compressed position in a baling station such that the volume of bulk material is ready to bale;

an instruction to an electro-servo motor of a bale strapping length feed drive to feed a length of bale strapping into a guide track loop when said moveable guide track section support strut assembly reaches said closed guide track loop position, wherein said length of bale strapping is determined by a number of rotations of a drive shaft of said electro-servo motor of said bale strapping feed drive;

an instruction to a tensioning gripper to grip a distal end portion of said length of bale strapping upon said distal end portion of said length of bale strapping having completed a transit of said guide track loop;

an instruction to at least one tensioning pin to extend upon said distal end portion of said length of bale strapping having completed said transit of said guide track loop;

an instruction to said bale strapping length feed drive to reverse drive direction for tensioning after said tensioning gripper secures said distal end portion of said length of bale strapping;

an instruction to a bale strapping length cutter to cut a proximal end of said length of bale strapping;

an instruction to a fastener to fasten together said proximal and distal end portions of said length of bale strapping;

an instruction to at least one fastener tie cylinder to reverse for return to a ready position after said proximal and distal end portions of said length of bale strapping are knotted;

an instruction to said at least one tensioning pin to retract after said proximal and distal end portions of said length of bale strapping are knotted;

an instruction to said bale strapping length feeder drive and to said tensioning gripper to release after said proximal and distal end portions of said length of bale strapping are fastened together; and an instruction to said moveable guide track section support strut assembly to move to an eject position after said proximal and distal end portions of said length of bale strapping are fastened together;

an instruction to said compression apparatus to release from said compressed position after said moveable guide track section support strut assembly moves away from said compression apparatus; and an instruction to said moveable guide track section strut assembly to return from eject position to ready position after an ejection apparatus ejects a bound bale from said baling station.

25. A data structure embodied in a machine readable storage medium in combination with a programmable logic controller in a bulk material baler control system comprising:

an instruction to a moveable guide track section support strut assembly to move from a ready position to a closed guide track loop position when a compression apparatus and a volume of bulk material reaches a compressed position in a baling station;

an instruction to an electro-servo motor of a bale strapping length feed drive to feed a length of bale strapping into a guide track loop upon receipt of a signal from said moveable guide track section support strut assembly that it has reached said closed guide track loop position, wherein said length of bale strapping is determined by a number of rotations of a drive shaft of said electro-servo motor of said bale strapping feed drive;

an instruction to a tensioning gripper to grip a distal end portion of said bale strapping length upon receipt of a signal from said electro-servo motor that said bale strapping length distal end has completed transit of said guide track loop;

an instruction to at least one tensioning pin to extend upon receipt of said signal from said electro-servo motor that said bale strapping length distal end has completed transit of said guide track loop;

an instruction to said bale strapping length drive to reverse drive direction for tensioning after receipt of a signal from said tensioning gripper that said bale strapping length has been gripped;

an instruction to a bale strapping length cutter to cut a proximal end of said bale strapping length after receipt of a signal from said bale strapping feeder drive that said bale strapping has reached a predetermined tension;

an instruction to a fastener to fasten together said proximal and distal end portions of said bale strapping length;

an instruction to at least one fastener tie cylinder to reverse for return to ready position when said bale strapping end portions are fastened together;

an instruction to said tensioning pins to retract after receipt of a signal from said fastener that said bale strapping length end portions are fastened together;

an instruction to said bale strapping length feeder drive and to said tensioning gripper to release after receipt of signal from said fastener that said bale strapping length end portions are fastened together;

an instruction to said moveable guide track section support strut assembly to move to an eject position after receipt of a signal from said bale strapping length feeder drive and said tensioning gripper that said predetermined tension is released;

an instruction to said compression apparatus to release from said compressed position after receipt of a signal from a proximity switch on said moveable guide track section support strut assembly that the moveable guide track sections are away from of said compression apparatus;

an instruction to an ejector apparatus to eject a bound bale from said baling station after receipt of a signal from said moveable guide track section support strut assembly that it has reached said eject position and after receipt of a signal from said compression apparatus that it is decompressed; and an instruction to said moveable guide track section strut assembly to return from said eject position to a ready position after receipt of a signal from said ejection apparatus that said bound bale has been ejected from said baling station.

* * * * *